C. H. EVERHART.
NUT-LOCK.

No. 181,425. Patented Aug. 22, 1876.

Attest:
Jno. A. Madigan
E. E. Court

Inventor:
Charles H. Everhart,
by Louis Bagger & Co.
Attys.

United States Patent Office.

CHARLES H. EVERHART, OF MANCHESTER, MARYLAND.

IMPROVEMENT IN NUT-LOCKS.

Specification forming part of Letters Patent No. 181,425, dated August 22, 1876; application filed June 5, 1876.

*To all whom it may concern:*

Be it known that I, CHARLES H. EVERHART, of Manchester, in the county of Carroll and State of Maryland, have invented certain new and useful Improvements in Nut-Locks; and I do hereby declare that the following is a full, clear, and exact description thereof, which will enable others skilled in the art to which it appertains to make and use the same, reference being had to the accompanying drawings, which form a part of this specification, and in which—

Figure 1:
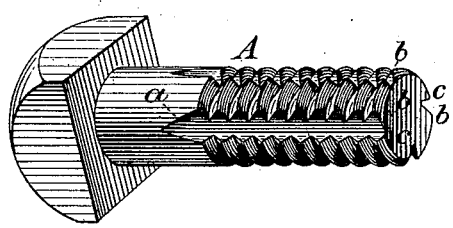
Figure 2:
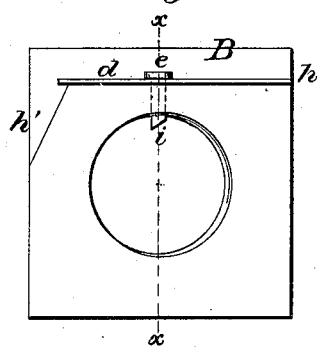
Figure 3:
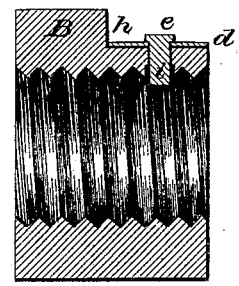
Figure 4:
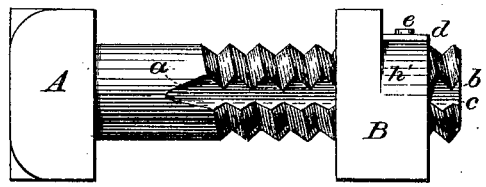

Figure 1 is a perspective view of the bolt, the nut being detached. Fig. 2 is an end view of the nut. Fig. 3 is a section of the same after the line $x$ $x$ in Fig. 2; and Fig. 4 is a side view of the nut upon the bolt.

Similar letters of reference indicate corresponding parts in all the figures.

The object of my invention is to provide an effective, durable, and easily-operated means for securing nuts upon bolts in such a manner that they shall not fall off, or even become loose by accident, or by the jarring of machinery, &c. It consists in the construction and combination of parts hereinafter more fully shown and described.

In the drawing, A is the bolt. This has two or more longitudinal grooves, $a$, each having an abrupt shoulder, $c$, and a gradually-sloping side, $b$, in which the locking device of the nut operates. B is the nut. One of the sides of this is recessed, as shown at $h$, and from this recess to the inside, or thread of the nut, leads a perforation, $e$. In the recess $h$ is secured a strong spring, $d$, having a beveled tongue, $i$, which projects through perforation $e$ to the inside of the nut, so as to engage with the grooves $a$.

The manner of operating my invention will be easily understood from the foregoing description. When the nut is adjusted upon the bolt, the tongue $i$, impelled by spring $d$, will form a spring-pawl that engages with the ratchets formed by the longitudinal grooves $a$ in the bolt, thus allowing the nut to turn freely in one direction, while, when it is attempted to turn it in the opposite direction for the purpose of removing it, it is prevented by the tongue $i$ abutting against shoulder $c$. The spring $d$, working within the recess $b$, it offers no obstruction to the use of a wrench.

It will be seen that while, in this manner, the accidental unlocking of the nut is rendered impossible it may be easily removed when desirable by inserting a wedge under the spring $d$, thus forcing it and the tongue $i$ outward, and disengaging the latter from the grooves $a$. The nut may then be easily removed by the aid of a wrench.

I am aware that it is not new, broadly, to lock a nut by means of a bolt or pivoted pawl, actuated by a spring placed within a recess in the nut; but the objection to this form of nut-locks, as heretofore constructed, has been, that in order to unlock and unscrew it, the retaining-pawl had to be removed by removing the pivoting-pin by which it is kept in place within the nut. My improvement, it will be observed, obviates the necessity for removing the lock-pin, which may be raised out of the way into its recess $e$ by simply inserting a wedge under the spring $d$, which projects slightly beyond the cut-off corner $h'$ of the recess $h$, as shown on the drawings, for the purpose of facilitating the operation of unlocking when desired.

Having thus described my improvement, I claim and desire to secure by Letters Patent of the United States—

1. In combination with the nut B, having intersecting-recesses $h$ $h'$, the spring $d$, secured within the recess $h$, and projecting beyond $h'$, substantially as and for the purpose hereinbefore set forth.

2. The combination of the nut B, having recesses $h$ $h'$, and lateral perforation $e$, with the projecting spring $d$ and beveled pin $i$, substantially as and for the purpose hereinbefore set forth.

In testimony that I claim the foregoing as my own I have hereto affixed my signature in presence of two witnesses.

CHARLES H. EVERHART.

Witnesses:
JACOB CAMPBELL,
CHARLES W. MOTTER.